(12) United States Patent
Malisoff et al.

(10) Patent No.: US 10,579,166 B2
(45) Date of Patent: Mar. 3, 2020

(54) POINTER ACCELERATION SYSTEM MODELING

(71) Applicants: Board of Supervisors of Louisiana State University and Agricultural and Mechanical College, Baton Rouge, LA (US); Georgia Tech Research Corporation, Atlanta, GA (US)

(72) Inventors: Michael Malisoff, Baton Rouge, LA (US); Fumin Zhang, Atlanta, GA (US); Jesse Paul Varnell, Atlanta, GA (US)

(73) Assignees: Board of Supervisors of Louisiana State University and Agricultural and Mechanical College, Baton Rouge, LA (US); Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/945,895

(22) Filed: Apr. 5, 2018

(65) Prior Publication Data

US 2018/0292912 A1 Oct. 11, 2018

Related U.S. Application Data

(60) Provisional application No. 62/481,783, filed on Apr. 5, 2017.

(51) Int. Cl.
*G06F 3/038* (2013.01)
*G06F 3/0354* (2013.01)
*G06F 3/0484* (2013.01)

(52) U.S. Cl.
CPC .......... *G06F 3/038* (2013.01); *G06F 3/03543* (2013.01); *G06F 3/03547* (2013.01); *G06F 3/04847* (2013.01)

(58) Field of Classification Search
CPC .. G06F 3/038; G06F 3/03543; G06F 3/03547; G06F 3/04847
See application file for complete search history.

(56) References Cited

U.S. PATENT DOCUMENTS

| | | | | |
|---|---|---|---|---|
| 5,587,558 | A * | 12/1996 | Matsushima | G06F 3/0346 178/18.01 |
| 6,995,748 | B2 * | 2/2006 | Gordon | G06F 1/3203 345/166 |
| 8,050,886 | B2 * | 11/2011 | Moussavi | G06F 3/0346 702/141 |
| 9,367,148 | B2 * | 6/2016 | Lee | G06F 3/0383 |
| 9,454,297 | B2 * | 9/2016 | Wolff-Petersen | G06F 3/03543 |

(Continued)

*Primary Examiner* — Peter D McLoone
(74) *Attorney, Agent, or Firm* — Thomas | Horstemeyer, LLP

(57) ABSTRACT

The present disclosure describes systems, methods, and apparatuses utilizing pointer acceleration system modeling. In one exemplary method, among others, such a method obtains, a closed loop pointer acceleration system model, in which the closed loop pointer acceleration system model is based on (1) a model describing user pointing motions integrated with (2) a model of pointer acceleration motions under operational conditions; obtains values for system parameters that include pointer acceleration profile parameters and operational condition parameters; and determines a set of pointer trajectories for a given acceleration profile having the pointer acceleration profile parameters and operational condition parameters.

15 Claims, 8 Drawing Sheets

(56) References Cited

U.S. PATENT DOCUMENTS

| | | | |
|---|---|---|---|
| 9,713,767 B2* | 7/2017 | Mahlmeister | A63F 13/22 |
| 9,927,883 B1* | 3/2018 | Lin | G06F 3/03543 |
| 9,931,565 B2* | 4/2018 | Mahlmeister | A63F 13/22 |
| 10,097,541 B2* | 10/2018 | Ashiya | H04L 63/0853 |
| 10,220,306 B2* | 3/2019 | Mahlmeister | A63F 13/22 |
| 2006/0224898 A1* | 10/2006 | Ahmed | G06F 21/316 |
| | | | 713/186 |
| 2009/0153482 A1* | 6/2009 | Weinberg | G06F 3/03 |
| | | | 345/163 |
| 2010/0042358 A1* | 2/2010 | Moussavi | G06F 3/0346 |
| | | | 702/141 |
| 2010/0315340 A1* | 12/2010 | Wolff-Peterson | |
| | | | G06F 3/03543 |
| | | | 345/163 |
| 2014/0078061 A1* | 3/2014 | Simons | G06F 3/03543 |
| | | | 345/163 |
| 2015/0193023 A1* | 7/2015 | Odgers | G06F 3/03543 |
| | | | 345/163 |
| 2015/0297991 A1* | 10/2015 | Mahlmeister | A63F 13/22 |
| | | | 463/29 |
| 2015/0301630 A1* | 10/2015 | Lee | G06F 3/0383 |
| | | | 345/163 |
| 2017/0282059 A1* | 10/2017 | Mahlmeister | A63F 13/22 |
| 2017/0324734 A1* | 11/2017 | Ashiya | H04L 63/0853 |
| 2018/0178115 A1* | 6/2018 | Mahlmeister | A63F 13/22 |
| 2018/0373352 A1* | 12/2018 | Tan | G06F 3/0312 |
| 2019/0143203 A1* | 5/2019 | Mahlmeister | A63F 13/22 |

* cited by examiner

Table I. Types of pointer acceleration.

| Name | Scaling function | I/O Velocity plot |
|---|---|---|
| No acceleration | $G(|\dot{\theta}|) = k_1$ | |
| Threshold | $G(|\dot{\theta}|) = \begin{cases} k_1, & \text{if } 0 \leq |\dot{\theta}| < c \\ k_2, & \text{if } |\dot{\theta}| \geq c \end{cases}$ | |
| Linear | $G(|\dot{\theta}|) = k_1 + k_2|\dot{\theta}|$ | |

FIG. 3

POINTER ACCELERATION SYSTEM MODELING

CROSS-REFERENCE TO RELATED APPLICATION

This application claims priority to U.S. provisional application entitled, "Control Method for Pointer Acceleration for Computer Mice or Other Interfaces," having Ser. No. 62/481,783, filed Apr. 5, 2017, which is entirely incorporated herein by reference.

STATEMENT REGARDING FEDERALLY SPONSORED RESEARCH OR DEVELOPMENT

This invention was made with government support under contract N00014-14-1-0635 awarded by the Office of Naval Research, contract ECCS-1102348 awarded by the Office of Naval Research, and contract CMMI-1436284 awarded by the National Science Foundation. The government has certain rights in the invention.

TECHNICAL FIELD

The present disclosure is generally related to implementation of pointer acceleration techniques by pointer input devices.

BACKGROUND

Pointer acceleration is often used in computer mice and other interfaces to increase the range and speed of pointing motions without sacrificing precision during slow movements. However, the effects of pointer acceleration are not yet well understood.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 depicts a table summarizing scaling function G (acceleration pointer profiles) that can be evaluated by embodiments of the present disclosure.

FIG. 6b is a plot of a perturbation set in accordance with the example of FIG. 6a.

DETAILED DESCRIPTION

Figure 1:
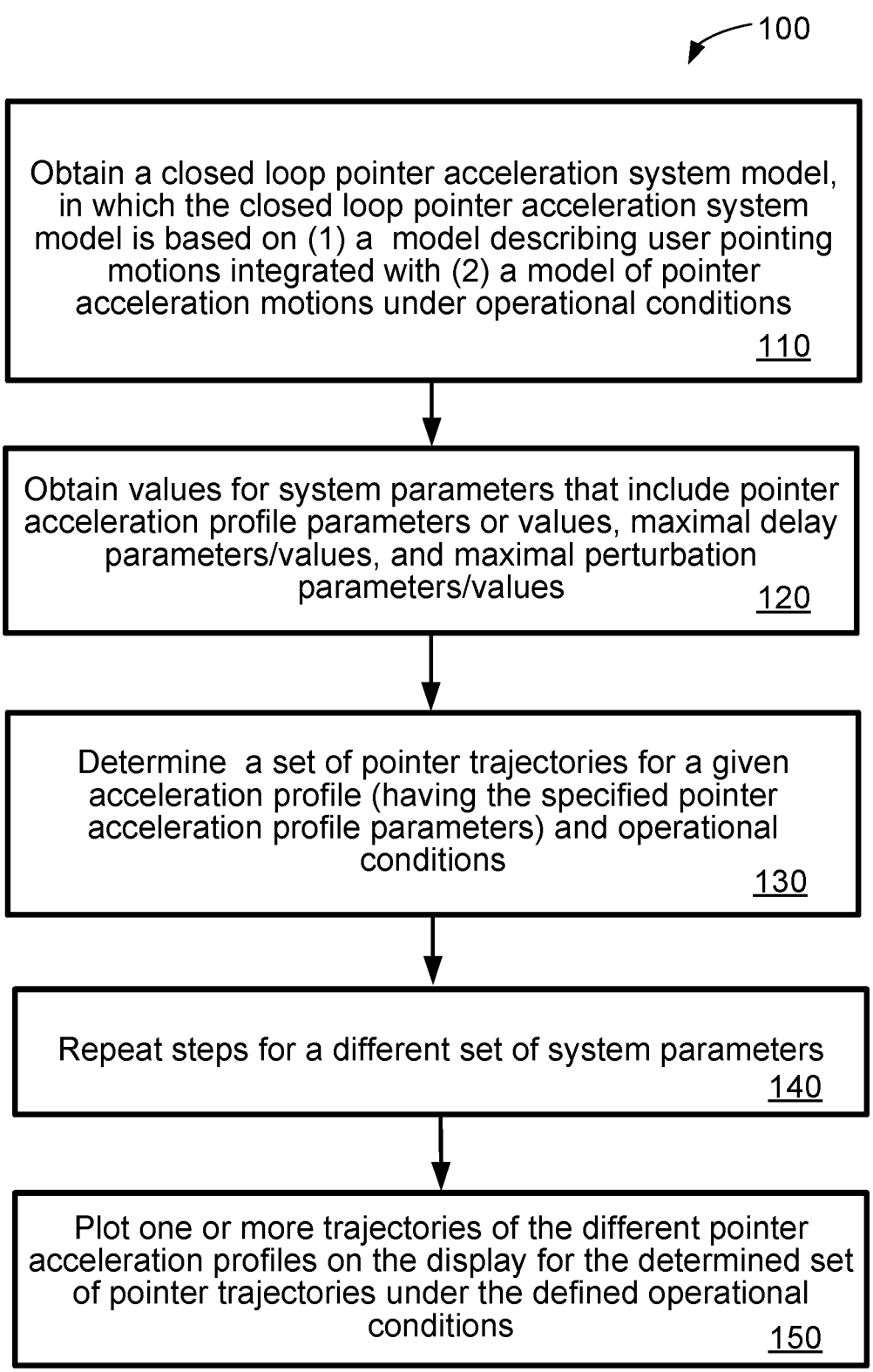
FIG. 1 is a flow chart diagram of an exemplary method for evaluating a pointer acceleration profile in accordance with embodiments of the present disclosure.

Aspects of the present disclosure are relevant to designing pointing interfaces. Methods, systems, and apparatuses of the present disclosure use a system perspective and feedback control to analyze the effects of pointer acceleration and optimize the performance of pointer acceleration of pointer devices under varying operational and user conditions, in various embodiments.

Pointing devices such as computer mice, joysticks, and touchpads are commonplace in today's computing and communication systems. Most of these devices use pointer acceleration techniques, which increases the sensitivity of the pointer as the speed of the pointer increases, to improve and speed up basic user interactions. Pointer acceleration helps by adjusting the device's sensitivity based on the user's movement speed, which allows the user to control the pointer with a wider range of speeds and makes the device feel more responsive. However, there has previously been a lack of systematic research in how to design and implement pointer acceleration so it is best for a particular task, interface, and user. Consequently, designers and users must manually tweak pointer acceleration settings in an attempt to reach desired levels of performance and comfort.

Embodiments of the present disclosure can characterize which acceleration profiles will provide a desired level of performance and stability properties under different operating conditions and/or user attributes. For example, by taking a systems perspective of an overall pointing system that includes the pointing device, pointer acceleration, and human user, as opposed to only considering the pointer device itself. The results show how acceleration profiles can affect the robustness of the overall pointing system to delays and disturbances, which can limit performance in many applications. Correspondingly, embodiments of the present disclosure can enable selection of selection of pointer acceleration system parameters that can enhance the performance of pointing devices under realistic operational conditions and/or user attributes, whereas current pointer acceleration methods are limited by heuristic designs that lack of consideration of feedback and robustness. For example, even though pointer acceleration is used widely, there is not yet a consensus on how much or what type of pointer acceleration should be used for a given task or interface. In practice, real implementations of pointer acceleration are usually designed by experimenting with different acceleration profiles without using specific design principles. There are also some disadvantages to pointer acceleration that are not yet completely understood. For instance, pointer acceleration may make it more difficult for the user to predict the motion of the pointer and to reproduce desired motions. This can decrease pointing accuracy and speed and can worsen the user's subjective rating of a device's feel.

However, by better understanding the effects of pointer acceleration and human pointing motion, embodiments of the present disclosure can be an important tool in the design of improved pointer interfaces having enhanced performance characteristics. Such performance enhancements may include improving the speed and precision of various pointing devices, which can lead to the development of improved interfaces and interactions for applications ranging from everyday computer use, to video games, virtual reality, remote control of unmanned underwater or space vehicles, etc.

Some example embodiments are directed to apparatuses and methods for evaluating pointer acceleration parameters within a pointer acceleration system model, in which the closed pointer acceleration model is based on a first model describing user pointing motions integrated with a second model of pointer acceleration motions. Accordingly, exemplary apparatuses and methods of the present disclosure can develop performance constraints for the pointer acceleration system model having the pointer acceleration parameters to converge to a defined stable state.

In the sections that follow, it is shown how a closed loop pointing system is affected by delays and perturbations. Correspondingly, in some embodiments, apparatuses and methods may define a relationship between maximum delay, maximum perturbation set, and a set of pointer trajectories for a given acceleration profile (or scaling function) that describes a defined stable state for the stated operational conditions (e.g., delay and perturbation parameters). Therefore, based on parameters for a given acceleration profile, maximum delay, and maximum perturbation set, the set of pointer trajectories (trajectory set S) for a given acceleration profile can be determined that will not exceed the stated operational conditions. Accordingly, different pointer acceleration profiles and their respective trajectory sets can be determined and evaluated under the same operational conditions.

Next, the flow chart of FIG. 1 shows an exemplary method for evaluating a pointer acceleration profile in accordance with embodiments of the present disclosure. The method 100 of FIG. 1 comprises a computing device 200 (FIG. 2) (or an acquisition module 220 of the same or a different computing device) obtaining (110) a closed loop pointer acceleration system model, in which the closed loop pointer acceleration system model is based on (1) a model describing user pointing motions integrated with (2) a model of pointer acceleration motions under operational conditions. Such operational conditions may be represented as delay and perturbation functions. Further, the computing device 200 (or the acquisition module 220) may obtain (120) values for system parameters that include pointer acceleration profile parameters or values, maximal delay parameters/values, and maximal perturbation parameters/values from a computing data store 290 and/or memory 250 and/or user input 280. The computing device (or a calculation module 230 of the same or a different computing device) may then determine (130) a set of pointer trajectories (trajectory set S) for a given acceleration profile (having the specified pointer acceleration profile parameters) and operational conditions. Then, the computing device, can repeat (140) the above-recited steps for a different set of system parameters defining a different pointer acceleration profile. Further, the computing device can output or present a side-by-side comparison of the resulting trajectory sets for the different pointer acceleration profiles on a display. Also, the computing device (or a simulation module 240) can plot (150) one or more trajectories of the different pointer acceleration profiles on the display.

The acquisition module 220, the calculation module 230, and/or the simulation module 240 can be implemented in software (e.g., firmware), hardware, or a combination thereof. For example, in an exemplary mode, the calculation module 230, among others, is implemented in software, as an executable program, and is executed by a special or general purpose digital computer. An example of a computer that can implement the calculation module 230 of the present disclosure is shown in FIG. 2.

Figure 2:
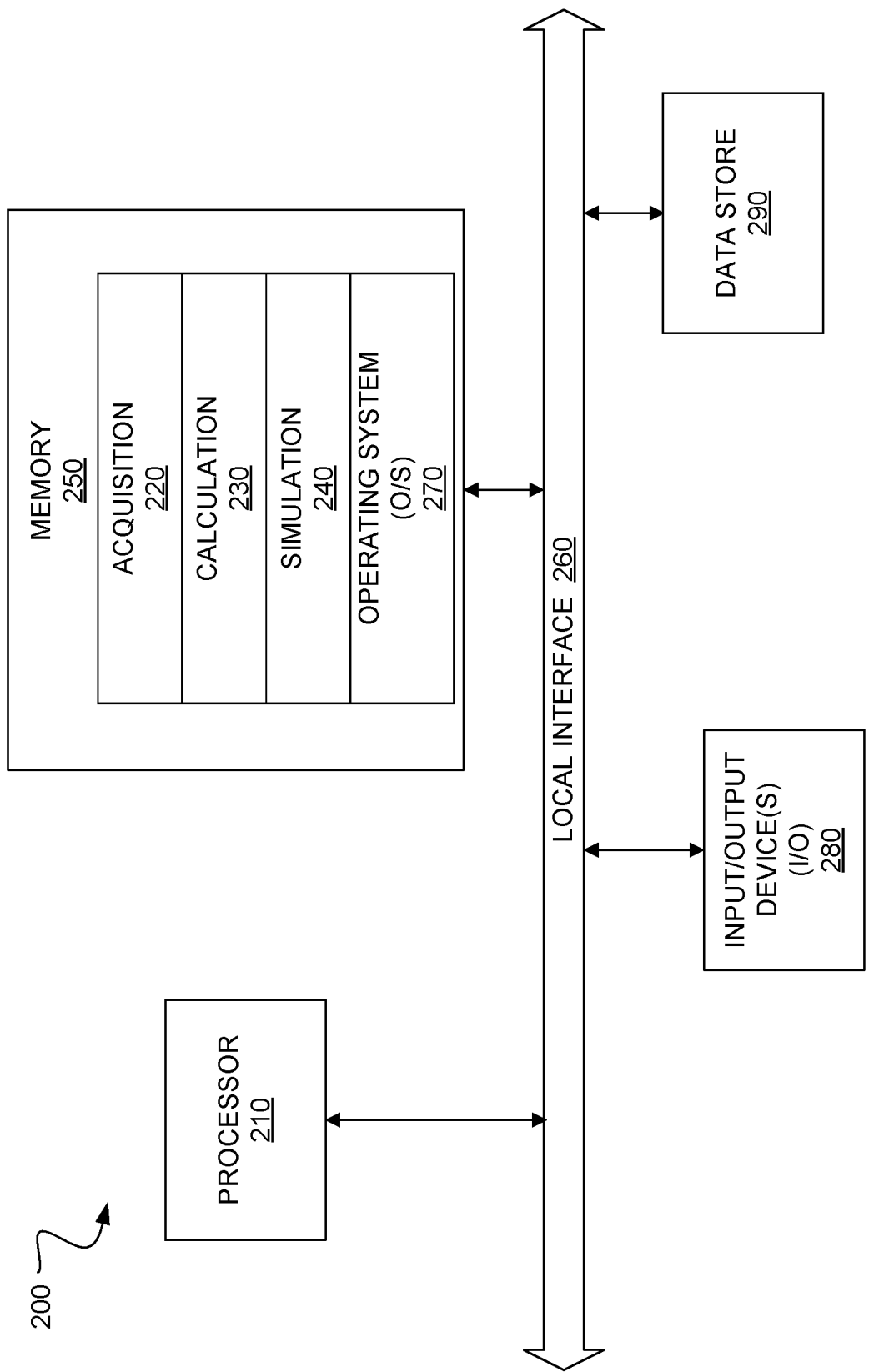
FIG. 2 is a block diagram of an exemplary computer that can implement one or more operations specified by the method of FIG. 1.

Generally, in terms of hardware architecture, as shown in FIG. 2, the computer 200 includes a processor 210, memory 250, and one or more input and/or output (I/O) devices 230 (or peripherals) that are communicatively coupled via a local interface 240. The local interface 260 can be, for example but not limited to, one or more buses or other wired or wireless connections, as is known in the art. The local interface 260 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 210 is a hardware device for executing software, particularly that stored in memory 250. The processor 210 can be any custom made or commercially available processor, a central processing unit (CPU), an auxiliary processor among several processors associated with the computer 200, a semiconductor based microprocessor (in the form of a microchip or chip set), a macroprocessor, or generally any device for executing software instructions.

The memory 250 can include any one or combination of volatile memory elements and nonvolatile memory elements. Moreover, the memory 250 may incorporate electronic, magnetic, optical, and/or other types of storage media. Note that the memory 250 can have a distributed architecture, where various components are situated remote from one another, but can be accessed by the processor 210.

The software in memory 250 may include one or more separate programs, each of which comprises an ordered listing of executable instructions for implementing logical functions. In the example of FIG. 2, the software in the memory 250 includes the calculation module 130 in accordance with an exemplary embodiment, among other modules 120, 140, and a suitable operating system (O/S) 270. The operating system 270 essentially controls the execution of other computer programs, such as the calculation module 130, and provides scheduling, input-output control, file and data management, memory management, and communication control and related services.

The I/O devices 280 may include input devices, for example but not limited to, a keyboard, mouse, scanner, microphone, etc. Furthermore, the I/O devices 280 may also include output devices, for example but not limited to, a printer, display, etc. Finally, the I/O devices 280 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the computer 200 is in operation, the processor 210 is configured to execute software stored within the memory 250, to communicate data to and from the memory 250, and to generally control operations of the computer 200 pursuant to the software. The calculation module 130 and the O/S 270, in whole or in part, but typically the latter, are read by the processor 210, perhaps buffered within the processor 210, and then executed.

In the following description, various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein.

As discussed, embodiments of the present disclosure utilize a systems perspective to evaluate pointer acceleration. In one embodiment, such a system model captures most existing implementations of pointer acceleration along with a model representation of human pointing dynamics with feedback delays or perturbations. To represent human pointing dynamics, a vector integration to endpoint (VITE) model is used in various embodiments. This approach is novel in that prior approaches have not represented a closed pointer system (for pointer device and the user) under realistic operational conditions. For example, perturbations can arise from discretization errors and inaccuracies in human perception and control. Embodiments of the present disclosure may also develop state performance bounds for the closed loop system, as related to Fitts Law, in order to find bounds on the allowable perturbations and/or delays that will allow for performance of a pointer device at a desired level. In the sections that follow, methodology of the embodiments of the present disclosure are discussed.

Section 1. Pointer Acceleration Background and Dynamics

Considerable research has shown that humans generate similar motions when reaching and pointing with their arms, laser pointers, mouse pointers, and other devices. The VITE model for pointing can be written as $$\begin{cases} \dot{v} = \gamma(-v + \rho - u) \\ \dot{y} = g(t)[v]_d^+ \end{cases} \quad (1)$$

where the gain g(t) is called the go signal, y>0 is an internal system parameter, ρ is the target position of the pointer, u is the feedback of the perceived position of the pointer, y is the true position of the pointer that is specified by the user, and the state v is called the difference vector. The operator $[\bullet]_d^+$ is used to switch the pointer motion off when the pointer overshoots its target, and is defined by $$[v]_d^+ = \begin{cases} v, & \text{if } <v, d> \geq 0 \\ 0, & \text{otherwise} \end{cases} \quad (2)$$

where d is typically defined as the direction from the pointer to the target at the initial time, so d=ρ(0)−u(0). The notation $[v]_d^+$ extends the original VITE model to allow arbitrary target locations.

One can use the VITE model to describe motion by a person trying to drive the true position y to the target position ρ for the pointer. If there is an overshoot and y passes over the target pointer position, then the human quickly stops, but does not take corrective action to move back closer to the target. The model parameters are adjusted by the human to fit different types of performance objectives, and these parameters can be viewed as being very slowly time varying. In Section 4, we show how a relationship between y and the pointer acceleration scaling function (also referred as a pointer acceleration profile) can ensure that key state performance bounds are met.

Pointer acceleration aims to make the pointer more sensitive at higher speeds than lower speeds. This enables quick and long pointer motions, as well as slow and precise pointer motions. As we will see below, pointer acceleration can make pointer motion less stable in the presence of feedback delays, in addition to making it more difficult for a user to predict pointer motion. Whether or not pointer acceleration improves a user's subjective feel for the pointing interface appears to be a very personal choice. Although many operating systems have some type of pointer acceleration as their default settings, many modern video games that require exact pointer movement do not use any pointer acceleration.

While there are many different pointer acceleration implementations, most can be described by the following model. We view pointer acceleration as a transformation of the user's pointer position output. If $v \in \mathbb{R}^n$ is the pointer position specified by the user, then the pointer acceleration output ω satisfies $$\dot{\omega} = G(|\dot{v}|)\dot{v} \quad (3)$$

where $G: \mathbb{R} \to \mathbb{R}$ is a suitable scaling function and $|\bullet|$ is the usual Euclidean norm (see Section 2 for notation used in this disclosure). A few popular choices for the scaling function G are summarized in Table I (shown in FIG. 3), including the Linear and Threshold scaling functions. The form of pointer acceleration (3) is in fact pointer velocity scaling, although we use the term pointer acceleration as this language is commonly used in the literature. We can typically approximate the profiles in such a way that G is positive definite and continuously differentiable, which can help us apply Theorem 3 later. A notable exception to the pointer acceleration model (3) involving actual acceleration is the polynomial scaling function $G_{polynomial}(|\dot{v}|, |\ddot{v}|) = k_1 + k_2|\dot{v}||\ddot{v}|$, which adjusts sensitivity using both pointer input acceleration and velocity. While we do not consider scaling functions that are a function of pointer input acceleration, we believe that it may be possible to extend our work to them. In practice, most pointing interfaces do not measure pointer velocity directly. Instead, the pointer velocity is computed via discretization for use in the acceleration system. While this is typically not a major issue, the resulting accelerated pointer output can be very irregular when the pointer moves very quickly, or when the scaling is very large. One typically mitigates this by limiting the maximum pointer speed output, but we do not consider this here; however, see Remark 3 for additive uncertainties on v that can represent discretization errors.

Figure 4:
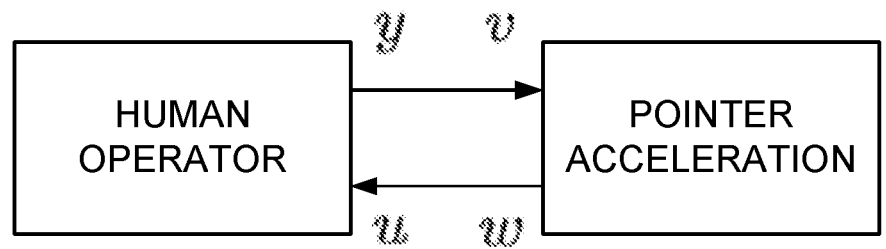
FIG. 4 is a block diagram representing the integration of a VITE model (representing human pointing dynamics) with a pointing acceleration model of a pointer device in accordance with embodiments of the present disclosure.

To connect the VITE model (1) with the pointing acceleration model (3), as in FIG. 4, we choose the input u=ω and the output v=y. In later sections, we consider feedback connections that have delays and perturbations, which may be present in real systems because of limitations in the human operator and computer interface. Choosing the overall state as $x=(\omega,v)^T=(x_1,x_2)^T$, the closed loop pointing dynamics become $$\dot{x} = \begin{bmatrix} \dot{\omega} \\ \dot{v} \end{bmatrix}$$

$$= \begin{bmatrix} G(|\dot{v}|)\dot{v} \\ \gamma(-v+\rho-u) \end{bmatrix}$$

$$= \begin{bmatrix} G(|\dot{y}|)\dot{y} \\ \gamma(-v+\rho-\omega) \end{bmatrix}$$

$$= \begin{bmatrix} G(|g(t)[v]_d^+|)g(t)[v]_d^+ \\ \gamma(-v+\rho-\omega) \end{bmatrix}$$

$$= \begin{bmatrix} G(|g(t)[x_2]_d^+|)g(t)[x_2]_d^+ \\ \gamma(-x_2+\rho-x_1) \end{bmatrix}.$$

For simplicity, we take g to be a constant, which is the most commonly considered case in the literature, and only consider one dimensional pointing dynamics, as most pointing motions are largely constrained to the line between the start and goal pointer position, even when there are additional degrees of freedom. We assume without loss of generality that ρ=0 and $x_1(0)=\omega(0)<0$, so d=ρ(0)−u(0)>0, which can always be achieved by a coordinate transformation. The closed loop dynamics are then $$\dot{x} = \begin{bmatrix} \tilde{G}(x_2^+)x_2^+ \\ -\gamma(x_1 + x_2) \end{bmatrix}, \quad (4)$$

where $x=(x_1,x_2)^T=(\omega,\nu)^T$ as defined previously, $\tilde{G}(\bullet)=gG$ (g•), and $x_2^+$ denotes the positive part, that is $p^+=p$ when $p\geq 0$, and p=0 when p<0. The desired equilibrium set is $$\mathbb{R} = \{x \in \varepsilon^2 : x_1 \geq 0, x_2 = -x_1\}, \quad (5)$$

but see below for more general pointing models with delays, perturbations, and state constraints.

Section 2: Definitions and Notations

In this section, all dimensions are arbitrary, unless indicated. We use the standard classes of comparison function $\kappa_\infty$ and $\kappa\mathcal{L}$. Let $\mathbb{R} \subseteq \varepsilon^n$. A function α defined on some set $\mathcal{O} \subseteq \varepsilon^n$ is positive definite with respect to $\varepsilon$ provided that it is zero at all points in $\varepsilon \cap \mathcal{O}$ and positive at all points in $\mathcal{O} \setminus \varepsilon$. We use $C^1$ to mean continuously differentiable, and we understand the derivative $f'(0)$ of any function $f$ that is defined on $[0,\infty)$ as the right derivative at 0. By piecewise continuity of a function defined on $[0,\infty)$, we mean that it is continuous except at finitely many points on each bounded interval. Let $u \subseteq \varepsilon^m$ and $\mathcal{M}_u$ denote the set of all piecewise continuous locally bounded functions δ: $[0,\infty) \to u$. For all $\delta \in \mathcal{M}_u$ and any interval $\mathcal{I} \subseteq [0,\infty)$, let $|\delta|_\mathcal{I}$ be the supremum of the restriction of δ to $\mathcal{I}$. Set $|x|_\mathbb{R} = \inf\{|x-r| : r \in \varepsilon\}$ for all $x \in \varepsilon^n$.

Given a constant τ≥0 (representing an input delay) and a set $\mathcal{S} \subseteq \varepsilon^n$, let $C_{in}(\mathcal{S})$ be set of all continuous functions $x_I$: $[-\tau,0] \to \mathcal{S}$, which we write as $C_{in}$ when $\mathcal{S}=\varepsilon^n$. We define the operators $x_t(s)=x(t+s)$ for all $s\in[-\tau, 0]$ and t≥0 and all functions x: $[-\tau,\infty) \to \varepsilon^n$. Given a function $\mathcal{F}: C_{in} \times u \to \varepsilon^n$, we call the system $\dot{x}(t)=\mathcal{F}(x_t,\delta(t))$ forward complete provided for each $x_I \in C_{in}$ and each $\delta \in \mathcal{M}_u$, the corresponding solution $x(t, x_I, \delta)$ of the system is uniquely defined for all $t \in [0,\infty)$. Given a subset $\mathcal{S} \subseteq \varepsilon^n$ and a forward complete system, we say that $\mathcal{S}$ is robustly forwardly invariant for the system with perturbations valued in $u$ provided $x(t, x_I, \delta) \in \mathcal{S}$ for all t≥0, $x_I \in C_{in}(\mathcal{S})$, and $\delta \in \mathcal{M}_u$. We say that $\mathcal{S}$ is robustly forwardly invariant for the system with the maximal perturbation set $u$ provided these two conditions hold: (a) $\mathcal{S}$ is robustly forwardly invariant for the system with perturbations valued in $u$ and (b) for each point $\bar{\delta} \in \mathbb{R}^m\setminus\text{closure}(u)$, there exists an initial function $x_I \in C_{in}(\mathcal{S})$ such that the trajectory $x(t,x_I,\bar{\delta})$ of the system for the constant perturbation $\delta(t)=\bar{\delta}$ admits a time $\bar{t}>0$ such that $x(t,x_I,\bar{\delta}) \in \mathbb{R}^n\setminus\mathcal{S}$. Maximality of $u$ therefore roughly means that enlarging $u$ would allow trajectories to leave $\mathcal{S}$. The special case of robust forward invariance where there are no perturbations δ is the standard strong invariance property.

The system is ISS with respect to $\varepsilon$ and $u$ on $\mathcal{S}$ provided (a) $\mathcal{S}$ contains $\varepsilon$ and is robustly forwardly invariant for the system with perturbations valued in $u$, and (b) there are functions $\beta \in \kappa\mathcal{L}$ and $\alpha \in \kappa_\infty$ such that for all solutions x(•, $x_I,\delta$) of the system for all $x_I \in C_{in}(\mathcal{S})$ and for all $\delta \in \mathcal{M}_u$, we have $|x(t,x_I,\delta)|_\varepsilon \leq \beta(\sup\{|x_I(r)|_\varepsilon : -\tau \leq r \leq 0\}, t) + \alpha(|\delta|_{[0,t]})$ for all t≥0. The special case of ISS where the $\alpha(|\delta|_{[0,t]})$ term is not present in the ISS estimate and $\mathcal{F}$ has no perturbations δ (i.e., $\dot{x}(t)=\mathcal{F}(x_t)$) is global asymptotic stability (or GAS) to $\varepsilon$ on $\mathcal{S}$.

If $\mathcal{S}$ is robustly forwardly invariant for a system with perturbations valued in $u$ and $\varepsilon \subseteq \mathcal{S}$, then a function V: $C_{in} \to \mathbb{R}^n$ is an ISS Lyapunov function for the system with respect to $\varepsilon$ and $u$ on $\mathcal{S}$ provided (a) $V(x_t)$ is differentiable as a function of t on $[0,\infty)$ for all solutions x(•) of the system with initial functions $x_I \in C_{in}(\mathcal{S})$ and (b) there are class $\kappa_\infty$ functions $\underline{\alpha}, \overline{\alpha}, \alpha_0$, and $\alpha_1$ such that along all trajectories x(t) of the system for all initial functions $x_I \in C_{in}(\mathcal{S})$ and for all choices of $\delta \in \mathcal{M}_u$, the following hold for all t≥0: $\underline{\alpha}(|x(t)|_\varepsilon) \leq V(x_t) \leq \overline{\alpha}(\sup\{|x(\ell)|_\varepsilon : \ell \in [t-\tau,t]\})$ and $$\frac{d}{dt}V(x_t) \leq -\alpha_0(V(x_t)) + \alpha_1(|\delta|_{[0,t]}).$$

Standard arguments show that the existence of an ISS Lyapunov function with respect to $\varepsilon$ and $u$ on $\mathcal{S}$ implies the ISS property with respect to $\varepsilon$ and $u$ on $\mathcal{S}$ when no delays are present:and the same can be shown under time delays, by similar: arguments that we omit here.

The special case of an ISS Lyapunov function for systems $\dot{x}(t)=\mathcal{F}(x_t)$ without perturbations is a strict Lyapunov function with respect to $\varepsilon$ on $\mathcal{S}$. This is a slightly more restrictive definition of strict Lyapunov functions, because $\alpha_0$ is normally allowed to be positive definite with respect to $\{0\}$, without necessarily being of class of $\kappa_\infty$, but there are techniques for transforming strict Lyapunov functions for cases where $\alpha_0$ is only positive definite into new Lyapunov functions that satisfy our requirements with $\alpha_0 \in \kappa_\infty$: The existence of a strict Lyapunov function implies GAS to $\varepsilon$ on $\mathcal{S}$. Unless indicated, we assume for simplicity in all of what follows that the initial functions $x_I \in C_{in}(\mathcal{S})$ are constant.

Section 3. Strict Lyapunov Function

To analyze the effects of time delays and perturbations on the closed loop pointing system with acceleration, we will examine its ISS properties using a strict Lyapunov function that we construct next. See Proposition 1 for ways to construct the function $\mathcal{H}$ in the following theorem, and see the sections below where we use the ideas from this section to prove results under state constraints and delays to get state performance bounds and robustness results.

Theorem 1

Let γ>0 be a constant, and $\bar{G}: [0,\infty) \to [0,\infty)$ be locally Lipschitz and positive valued on $(0,\infty)$ and satisfy $\liminf_{r\to\infty} \bar{G}(r) > 0$. Let $\mathcal{H}: \mathbb{R} \to \mathbb{R}$ be a $C^1$ function satisfying:

(1) $\mathcal{H}(r) = 0$ for all $r \leq 0$, and $\mathcal{H}(r) > 0$ for all $r > 0$, (2) $\int_0^r \tilde{G}(\ell)\ell d\ell \geq (2/\gamma)\mathcal{H}^2(r)$ for all $r \geq 0$, (3) $r\tilde{G}(r) \geq \mathcal{H}(r)$ for all $r \geq 0$, and (4) $\mathcal{H}'(0) = 0$, and $0 < \mathcal{H}'(r) \leq \frac{\gamma}{4}$ for all $r > 0$.

Then the function $$V_{new}(x) = \int_0^{x_2} \tilde{G}(\zeta^+)\zeta^+ d\zeta + \frac{\gamma}{2}(x_1 + x_2)^2 - \mathcal{H}(x_2)(x_1 + x_2) \quad (6)$$

satisfies the estimates $$\frac{1}{10}\int_0^{x_2} \tilde{G}(\zeta^+)\zeta^+ d\zeta + \frac{\gamma}{4}(x_1+x_2)^2 \le V_{new}(x) \le \quad (7)$$

$$\int_0^{x_2} \tilde{G}(\zeta^+)\zeta^+ d\zeta + \frac{\mathcal{H}^2(x_2)}{2} + \frac{\gamma+1}{2}(x_1+x_2)^2$$

for all $x \in \mathbb{R}^2$ and $$\dot{V}_{new}(x) \le -\frac{\gamma^2}{4}(x_1+x_2)^2 - \frac{1}{2}\mathcal{H}(x_2)\tilde{G}(x_2^+)x_2^+ \quad (8)$$

along all trajectories of (4), and so is a strict Lyapunov function for (4) with respect to $\varepsilon = \{x \in \mathbb{R}^2: x_1 \ge 0, x_2 = -x_1\}$ on $\mathcal{S} = \mathbb{R}^2$. Therefore, (4) satisfies GAS with respect to (5) on $\mathcal{S} = \mathbb{R}^2$.

Proof

We can expand the first term of (6) and apply Condition (2) as $$V_{new}(x) = \frac{1}{10}\int_0^{x_2} \tilde{G}(\zeta^+)\zeta^+ d\zeta +$$

$$\frac{9}{10}\int_0^{x_2} \tilde{G}(\zeta^+)\zeta^+ d\zeta + \frac{\gamma}{2}(x_1+x_2)^2 - \mathcal{H}(x_2)(x_1+x_2) \ge$$

$$\frac{1}{10}\int_0^{x_2} \tilde{G}(\zeta^+)\zeta^+ d\zeta + \frac{9}{5\gamma}\mathcal{H}^2(x_2) + \frac{\gamma}{2}(x_1+x_2)^2 - |\mathcal{H}(x_2)(x_1+x_2)|$$

where we applied Condition (2) with the choice $r=x_2$ and also need the fact that $\mathcal{H}=0$ on $(-\infty,0)$ and the lower bound $-\mathcal{H}(x_2)(x_1+x_2) \ge -|\mathcal{H}(x_2)(x_1+x_2)|$. By Young's inequality, we also have $$|\mathcal{H}(x_2)(x_1+x_2)| \le \frac{1}{\gamma}\mathcal{H}^2(x_2) + \frac{\gamma}{4}(x_1+x_2)^2$$

for all $x \in \mathbb{R}^2$. Combining the preceding two inequalities gives the lower bound in (7). The upper bound in (7) follows by using the triangle inequality $-\mathcal{H}(x_2)(x_1+x_2) \le \frac{1}{2}\mathcal{H}(x_2) + \frac{1}{2}(x_1+x_2)^2$ to upper bound the term $-\mathcal{H}(x_2)(x_1+x_2)$ in the formula (6).

To prove the decay condition (8), notice that along all trajectories of (4), we can use the triangle inequality to get $$\dot{V}_{new} = -\gamma\tilde{G}(x_2^+)x_2^+(x_1+x_2) + \gamma\mathcal{H}(x_2)(x_1+x_2)^2 + \quad (9)$$

$$(\gamma(x_1+x_2)-\mathcal{H}(x_2))(\tilde{G}(x_2^+)x_2^+ - \gamma(x_1+x_2)) \le -\gamma^2(x_1+x_2)^2 -$$

$$\mathcal{H}(x_2)\tilde{G}(x_2^+)x_2^+ + \left(\left(\frac{\gamma^2}{2}+\gamma\mathcal{H}(x_2)\right)(x_1+x_2)^2 + \frac{1}{2}\mathcal{H}^2(x_2)\right).$$

Also, by Conditions (3)-(4), we have $$\gamma\mathcal{H}(x_2) \le \frac{\gamma^2}{4} \text{ and } \frac{1}{2}\mathcal{H}^2(x_2) \le \frac{1}{2}\mathcal{H}(x_2)x_2^+\tilde{G}(x_2^+) \quad (10)$$

when $x_2 \ge 0$; furthermore, (10) holds when $x_2 < 0$ as well, because in this case $\mathcal{H}(x_2) = \mathcal{H}'(x_2) = 0$ by Conditions (1) and (4). Using (10) to upper bound the terms in curly braces in (9) gives (8). Letting $V^l(x)$ and $V^u(x)$ denote the lower and upper bounding functions for $V_{new}(x)$ in (7), respectively, we then choose $$\underline{\alpha}(s) = \frac{s}{1+s}inf\{V^l(x):|x|_\varepsilon \ge s\},$$

$\overline{\alpha}(s) = s + \sup\{V^u(x):|x|\varepsilon \le s\}$, and the composition $\alpha_0 = \alpha_1 \circ \overline{\alpha}^{-1}$ to satisfy the requirements in our strict Lyapunov function definition with $\tau = 0$, where $$\alpha_1(s) = \frac{s}{1+s}inf\{\gamma^2(x_1+x_2)^2/4 + \mathcal{H}(x_2)\tilde{G}(x_2^+)x_2^+/2:|x|_\varepsilon \ge s\}.$$

An important motivation for having an explicit construction for $\mathcal{H}$ from Theorem 1 comes from the possibility of redesigning the output of the pointer acceleration system to make the closed loop system ISS when there is a perturbation. Given $\mathcal{H}$, it is possible to construct a redesigned pointer acceleration output $w^\sharp$ such that when there are perturbations $\delta$ in the feedback connection $u = w^\sharp + \delta$, the dynamics:

$$\dot{x} = \begin{bmatrix} \tilde{G}(x_2^+)x_2^+ \\ -\gamma(\omega^\sharp(x) + x_2 + \delta) \end{bmatrix} \quad (11)$$

is ISS with respect to $\varepsilon$ and $u = \mathbb{R}$ on $\mathcal{S} = \mathbb{R}^2$. This is because we can take $w^\sharp(x) = x_1 + \gamma(\partial V_{new}(x)/\partial x_2)$, which can be expressed in terms of $\overline{G}$ and $\mathcal{H}$ from the strict Lyapunov function $V_{new}$ in (6), and use $\alpha_0 \in \kappa_\infty$ from our proof of Theorem 1 and the triangle inequality to get $-|\gamma(\partial V_{new}(x)/\partial x_2)|^2 - \gamma(\partial V_{new}(x)/\partial x_2)\delta \le -0.5|\gamma(\partial V_{new}(x)/\partial x_2)|^2 + 0.5|\delta|^2$ and so also $\dot{V}_{new} \le -\alpha_0(V_{new}(x)) + 0.5|\delta|^2$ along all trajectories of (11), so $V_{new}$ an ISS Lyapunov function, which implies the ISS property. This motivates finding a formula for $\mathcal{H}$, and under standard conditions on $\overline{G}$ (which hold for many examples of interest from Section 1), we can readily find a function $\mathcal{H}$ satisfying the requirements from Theorem 1. For instance, we prove the following:

Proposition 1

Let $\gamma > 0$ be a positive constant, and $\overline{G}:[0,\infty) \to [0,\infty)$ satisfy the requirements from Theorem 1 and admit a constant $c_a > 0$ such that $\overline{G}(r) \ge c_a r$ for all $r \ge 0$. Set $$\overline{\kappa} = \min\left\{c_a, \sqrt{\frac{\gamma}{6}c_a}, \frac{\gamma}{8}\right\}. \quad (12)$$

Then for any constant $\kappa_0 \in (0, \overline{\kappa}]$, the function $$\mathcal{H}(\ell) = \kappa_o \frac{(\ell^+)^2}{1+(\ell^+)^2} \quad (13)$$

satisfies Conditions (1)(4) from Theorem 1, so (6) with the choice (13) is a strict Lyapunov function for (4) with respect to (5) on $\mathcal{S} = \mathbb{R}^2$.

Proof

Condition (2) holds because our lower bound on $\bar{G}$ gives $$\int_0^r \tilde{G}(\ell)\ell d\ell \geq \int_0^r c_a \ell^2 d\ell = \frac{c_a}{3}r^3 \geq \frac{c_a}{3}\frac{r^4}{(1+r^2)^2} \geq \frac{2}{\gamma}\mathcal{H}^2(r) \quad (14)$$

for all r≥0, where the second inequality followed by separately considering the cases r≥1 and r<1, and where the last inequality used the fact that $\kappa_0 \leq \sqrt{\gamma c_a/6}$. To check Condition (3), note that $$\mathcal{H}(r) \leq c_a \frac{r^2}{1+r^2} \leq c_a r^2 \leq r\tilde{G}(r) \quad (15)$$

holds for all r≥0. Condition (4) holds because $\kappa_0 \leq \gamma/8$, so $$\mathcal{H}'(r) = \kappa_o \frac{2r}{(1+r^2)^2} \leq \frac{\gamma}{4}\frac{r}{(1+r^2)^2} \leq \frac{\gamma}{4}$$

for all r≥0, which proves the proposition.

Although (11) is ISS, it is useful to find conditions under which the original closed loop system (4) is ISS with respect to additive uncertainties on the original output $w^\sharp(x)=x_1$ on suitable robustly forwardly invariant sets with maximal perturbation sets. The ISS and invariance properties of the original system characterizes its robustness under different choices of scaling functions and other parameters. We begin this analysis with our next section on robust forward invariance.

Section 4. Robust Forward Invariance

The preceding analysis motivates the problem of finding maximal allowable perturbation sets for robustly forwardly invariant sets, because the perturbation bounds one can obtain from ISS Lyapunov functions may be conservative.

Figure 5:
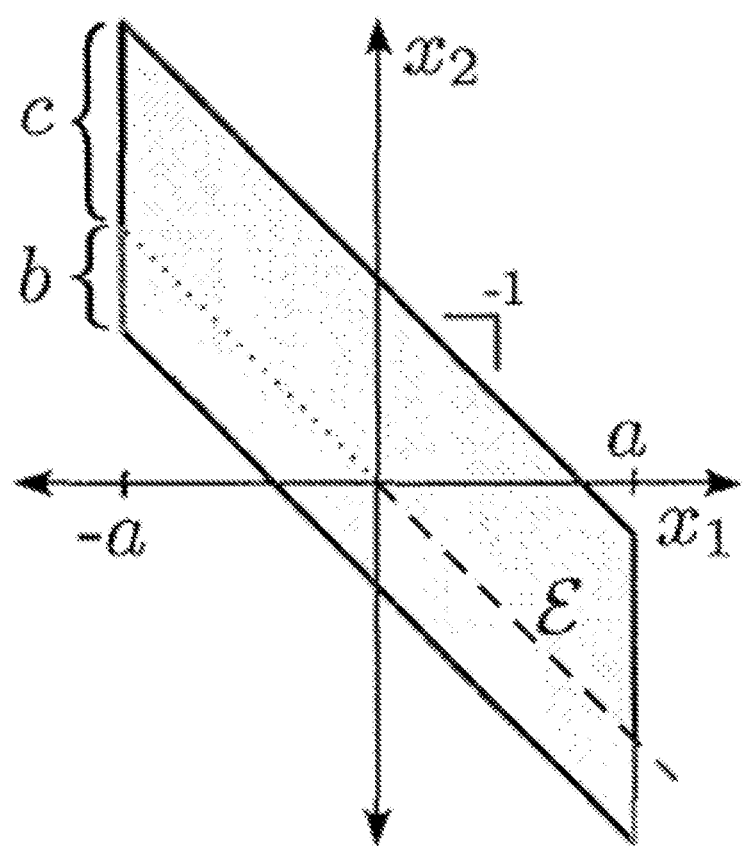
FIG. 5 is a plot of a robustly forwarding invariant set of trajectories in accordance with one example of the present disclosure.

In this section, we first provide an analogous result for the undelayed pointing dynamics $$\dot{x} = \begin{bmatrix} \tilde{G}(x_2^+)x_2^+ \\ -\gamma(x_1 + x_2 + \delta(t)) \end{bmatrix} \quad (16)$$

with uncertainties δ under suitable conditions on $\bar{G}$. Later, we use the δ's to represent control uncertainty, or the effects of input delays. For what follows, we set $\tilde{G}^\sharp(r)=r\tilde{G}(r)$, and we use the sets $$S_{a,b,c} = \{x \in \mathbb{R}^2 : |x_1| \leq a, -b \leq x_1 + x_2 \leq c\} \quad (17)$$

for suitable constants a>0, b>0, and c>0; see FIG. 5.

Proposition 2

Let $\bar{G}:[0,\infty) \to [0,\infty)$ be locally Lipschitz and positive valued on $(0,\infty)$. Let γ, a, b, and c be any positive constants such that $c > |\tilde{G}^\sharp|_{[0,a+c]}/\gamma$ and $a > \max\{b, c\}$. Then $S_{a,b,c}$ is robustly forwardly invariant for (16) with the maximal perturbation set $\mathcal{D}_{a,b,c} = ((1/\gamma)|\tilde{G}^\sharp|_{[0,a+c]}-c,b)$.

Proof

To prove robust forward invariance of $S_{a,b,c}$, it suffices to consider continuous δ's, because if $x(t,x_1,\delta)$ was a trajectory for (16) that starts in $S_{a,b,c}$ for a piecewise continuous δ but exits $S_{a,b,c}$, then we could approximate δ by a continuous $\mathcal{D}_{a,b,c}$ valued perturbation $\delta_c$ (in the $L^1$ norm) such that $x(t,x_1,\delta_c)$ also exited $S_{a,b,c}$. Set $c_p=c-|\tilde{G}^\sharp|_{[0,a+c]}/\gamma$, and note that $x_2^+ \in [0,a+c]$ for all $x \in S_{a,b,c}$. If $\delta:[0,\infty) \to \mathcal{D}_{a,b,c}$ is continuous and t≥0 were such that a corresponding trajectory $x(\cdot)$ of (16) for δ starts in $S_{a,b,c}$ and $x(t)$ is on the top leg of $S_{a,b,c}$, then $x_1(t)+x_2(t)=c$, so $$\dot{x}_1(t) + \dot{x}_2(t) = \quad (18)$$
$$-\gamma\left(c + \delta(t) - \frac{1}{\gamma}\tilde{G}(x_2^+(t))x_2^+(t)\right) < -\gamma(c - |\tilde{G}^\sharp|_{[0,a+c]}/\gamma) + \gamma c_p = 0.$$

This prevents $x(t)$ from exiting $S_{a,b,c}$ through the top leg of $S_{a,b,c}$, except possibly at times t when $x_1(t)=\pm a$, by continuity of $\dot{x}_1(\ell)+\dot{x}_2(\ell)$, which implies that $x_1(\ell)+x_2(\ell)$ is decreasing in an interval of $\ell$ values of the form $[t, t+\ell_*]$ for some $\ell_*>0$. (The strictness of the inequality in (18) is needed to ensure that $x_1(\ell)+x_2(\ell)$ is decreasing in such an interval of $\ell$ values.) Similarly, if $x(t)$ is on the bottom leg of $S_{a,b,c}$, then $x_1(t)+x_2(t)=-b$, so we instead get $\dot{x}_1(t)+\dot{x}_2(t)=\tilde{G}(x_2^+(t))x_2^+(t)-\gamma(-b+\delta(t))\geq \gamma(b-\delta t))>0$, which prevents $x(t)$ from leaving $S_{a,b,c}$ through the bottom leg of $S_{a,b,c}$, except possibly if $x_t(t)=\pm a$. As a>b, we get $x_2>0$ and so also $\dot{x}_1>0$ on the left leg of $S_{a,b,c}$. Also, $\dot{x}_1=0$ on the right leg of $S_{a,b,c}$, as a>c ensures that $x_2^+=0$ on the right leg of $S_{a,b,c}$. (Without the condition a>c, we could have $\dot{x}_1>0$ on the right leg of $S_{a,b,c}$, which would allow trajectories to exit through the right leg.) This proves the robust forward invariance property.

To prove the maximality of $\mathcal{D}_{a,b,c}$, first note that for each constant d>b, the trajectory of (constant perturbation $\delta(t)=d$ starting at the initial state $(-b, 0)$ on the bottom leg of $S_{a,b,c}$ satisfies $\dot{x}_1(0)+\dot{x}_2(0)=\tilde{G}(x_2^+(0))x_2^+(0)-\gamma(-b+d)<0$, so the trajectory leaves $S_{a,b,c}$ through $(-b,0)$. Also, if $d<-c_p$ is any constant, and if we choose $\upsilon \in [0,a+c]$ such that $\tilde{G}^\sharp(\upsilon)=|\tilde{G}^\sharp|_{[0,a+c]}$, then the trajectory for the constant perturbation $\delta(t)=d$ starting at the point $(c-\upsilon,\upsilon)$ on the top leg of $S_{a,b,c}$ satisfies $$\dot{x}_1(0) + \dot{x}_2(0) = \tilde{G}(\upsilon)\upsilon - \gamma(c+d) \quad (19)$$
$$= -\gamma(c - |\tilde{G}^\sharp|_{[0,a+c]}/\gamma + d) > 0,$$

so $x(\cdot)$ exits $S_{a,b,c}$. This proves the maximality of $\mathcal{D}_{a,b,c}$.

Remark 1

We can replace the bounds $-a \leq x_1 \leq a$ in the definition of $S_{a,b,c}$ by $-a \leq x_1 \leq d$ for any constant d>c; the proof of the robust forward invariance with this change is as before. The requirement $c > |\tilde{G}^\sharp|_{[0,a+c]}/\gamma$ from Proposition 2 holds if γ>0 is large enough. While robust forward invariance does not imply convergence to $\varepsilon$, it can be used with our Lyapunov analysis to prove asymptotic convergence to $\varepsilon$ while maintaining suitable state performance bounds; see below. We can choose $(a, b, c) \in (0, \infty)^3$ such that the robustly forwardly invariant set $S_{a,b,c}$ is arbitrary large. Also, even though each set $S_{a,b,c}$ is a proper subset of $\mathbb{R}^2$, we can build a nested sequence $S_1 \subseteq S_2 \subseteq \ldots$ of such sets whose union $\cup_i S_i = \mathbb{R}^2$. This allows us to make statements about global system behavior.

Figure 6A:
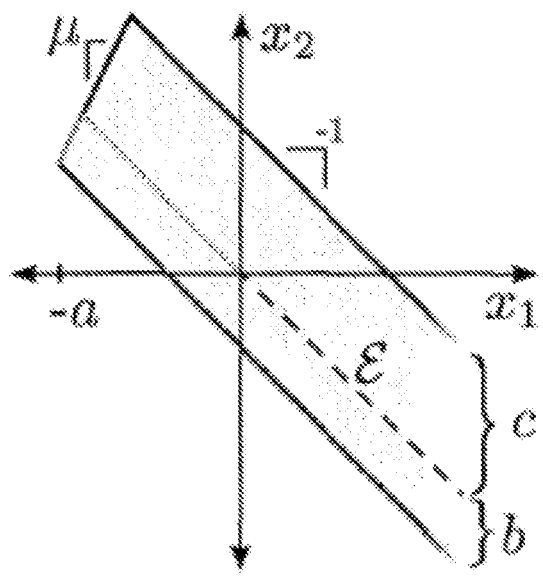
FIG. 6a is a plot of a robustly forwarding invariant set of trajectories in accordance with an additional example of the present disclosure.
Figure 6B:
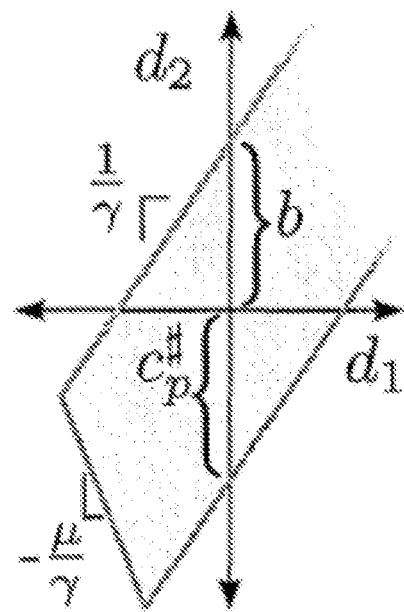

Two pertinent features of Proposition 2: are (a) the compactness of the robustly forwardly invariant sets $S_{a,b,c}$; and (b) the fact that the maximum perturbation sets $\mathcal{D}_{a,b,c}$ are intervals. If we relax the conditions that the robustly forwardly invariant sets and maximum perturbation sets must be bounded, then for each constant $\mu>1$, we can prove robust forward invariance results for the more general system $$\dot{x} = \begin{bmatrix} \tilde{G}(x_2^+)x_2^+ + \delta_1(t) \\ -\gamma(x_1 + x_2 + \delta_2(t)) \end{bmatrix}, \quad (20)$$

with perturbations $\delta_i$ in both equations, by replacing $S_{a,b,c}$ by $$S_{a,b,c}^\mu = \left\{ \begin{array}{c} x \in \mathbb{R}^2 : -b \leq x_1 + x_2 \leq c, x_1 \geq -a, \text{ and} \\ x_2 \leq \mu x_1 + (\mu+1)a - b \end{array} \right\} \quad (21)$$

for any constant $a > \max\{b,c\}$; see FIG. 6a-b. To see how, let $\ell_\mu$ denote the upper left kg of $S_{a,b,c}^\mu$, having the slope $\mu$. Then $\ell_\mu \subseteq (-\infty, 0) \times (0, \infty)$, because $x_1 \leq -a+(b+c)/(1+\mu) < 0$ for all $x_1$ such that $x \in \ell_\mu$. Let $$\overline{\sigma}_\mu = \max\left\{-\tilde{G}^\sharp(x_2) - \frac{\gamma}{\mu}(x_1+x_2) : x \in \ell_\mu\right\},$$

$$c_p^\sharp = c - \frac{1}{\gamma}\max\left\{\tilde{G}^\sharp(s) : s \in \left[0, a+c - \frac{c+b}{1+\mu}\right]\right\}, \text{ and}$$

$$\mathcal{D}_{a,b,c}^\mu = \left\{d \in \mathbb{R}^2 : \max\left\{\frac{d_1}{\gamma} - c_p^\sharp, \frac{\mu}{\gamma}(\overline{\sigma}_\mu - d_1)\right\} < d_2 < \frac{d_1}{\gamma} + b\right\}.$$

We then prove Proposition 3.

Proposition 3

If $\mu>1$ is a constant and $\gamma$, $\overline{G}$, a, b, and c satisfy the assumptions from Proposition 2, then $S_{a,b,c}^\mu$ is a robustly forwardly invariant set for (20) with the maximum perturbation set $\mathcal{D}_{a,b,c}^\mu$.

Proof

We indicate the changes needed in the proof of Proposition 2. We replace $S_{a,b,c}$, $\mathcal{D}_{a,b,c}$, and $c_p$ by $S_{a,b,c}^\mu$, $\mathcal{D}_{a,b,c}^\mu$, and $c_p^\sharp$, respectively. For each $d \in \mathcal{D}_{a,b,c}^\mu$, we have $-c_p^\sharp < d_2 - d_1/\gamma < b$. Hence, our treatment of the slope $-1$ legs of $S_{a,b,c}$ in the proof of Proposition 2 (with $\delta$ replaced by $\delta_2 - \delta_1/\gamma$), combined with the fact that $x_2 \leq a+c-(c+b)/(1+\mu)$ for all $x \in S_{a,b,c}^\mu$, imply that no trajectory of (20) starting in $S_{a,b,c}^\mu$ for any $\mathcal{D}_{a,b,c}^\mu$-valued continuous perturbation can exit through either of the slope $-1$ legs of $S_{a,b,c}^\mu$, except possibly though an endpoint of $\ell_\mu$. On the other hand, for any trajectory $x(\cdot)$ of (20) for any $\mathcal{D}_{a,b,c}^\mu$-valued continuous perturbation $\delta(\cdot)$ and any time $t \geq 0$ such that $x(t) \in \ell_\mu$, our definition of $\mathcal{D}_{a,b,c}^\mu$ gives $\dot{x}_2(t) - \mu\dot{x}_1(t) = -\gamma(x_1(t)+x_2(t)+\delta_2(t)) - \mu \tilde{G}^\sharp(x_2(t)) - \mu\delta_1(t) \leq \mu(\overline{\sigma}_\mu - ((\gamma/\mu)\delta_2(t) + \delta_1(t))) < 0$. Because $x_2 - \mu x_1$ is the $x_2$ axis intercept of the line through any point x having slope $\mu$, this implies that $x(\cdot)$ cannot exit $S_{a,b,c}^\mu$ through $\ell_\mu$. Finally, the maximality of $\mathcal{D}_{a,b,c}^\mu$ follows from the maximality part of the proof of Proposition 2 (with $|\tilde{G}^\sharp|_{[0,a+c]}$ and $\delta$ replaced by $|\tilde{G}^\sharp|_{[0,a+c-(c+b)/(1+\mu)]}$ and $\delta_2 - \delta_1/\gamma$, respectively), combined with the fact that the maximum in the definition of $\overline{\sigma}_\mu$ occurs at some point $\overline{x} \in \ell_\mu$. Hence, for any $\overline{d} = (\overline{d}_1, \overline{d}_2) \in \mathbb{R}^2$ such that $(\mu/\gamma)(-\overline{d}_1 + \overline{\sigma}_\mu) > \overline{d}_2$ and the trajectory $x(\cdot)$ of (20) starting at the maximizing pair $\overline{x}$ for the constant perturbation $\delta(t) = \overline{d}$, we get $\dot{x}_2(0) - \mu\dot{x}_1(0) = \mu((\overline{\rho}_\mu - ((\gamma/\mu)\overline{d}_2 + \overline{d}_1)) > 0$, so the trajectory through a $S_{a,b,c}^\mu$ through $\overline{x} \in \ell_\mu$.

Remark 2

The maximum perturbation sets $\mathcal{D}_{a,b,c}^\mu$ are complicated because they are not product sets. However, if the assumptions of Proposition 3 hold, then we can choose $\mu$ large enough such that $\overline{\sigma}_\mu < 0$, because $x_2 > 0$ for all $x \in \ell_\mu$. Then for all constants $r_0 \in (0,1)$, the set $\mathcal{D}_{a,b,c}^\mu$ the open product set neighborhood $$\mathcal{D}_{a,b,c}^{b,\mu} = (-(1-r_0)\gamma\mathcal{M}_0, (1-r_0)\gamma\mathcal{M}_0) \times (-r_0\mathcal{M}_0, r_0\mathcal{M}_0) \quad (22)$$

of 0, where $\mathcal{M}_0 = \min\{b, c_p^\sharp, -\overline{\sigma}_\mu/\gamma\} > 0$. In fact, for each $d = (d_1, d_2)$ in the set (22), we get $(d_1/\gamma) - c_p^\sharp < (1-r_0)\mathcal{M}_0 - c_p^\sharp > d_2 \mathcal{M}_0 - c_p^\sharp \leq d_2$, $(\mu/\gamma)(\overline{\sigma}_\mu - d_1) < (\mu/\gamma)(\overline{\sigma}_\mu + (1-r_0)\gamma\mathcal{M}_0) < (\mu/\gamma)(\overline{\sigma}_\mu + \gamma\mathcal{M}_0) - r_0\mathcal{M}_0 < d_2$, and $(d_1/\gamma) + b > -(1-r_0)\mathcal{M}_0 + b \geq r_0\mathcal{M}_0 > d_2$, which shows that $d \in \mathcal{D}_{a,b,c}^\mu$.

Remark 3

We can use the sets (22) to cover more general pointer acceleration models that could have additive uncertainties on the pointer position measurements, that is, $\upsilon = y + \Delta$, where we assume that $\Delta$ is a $C^1$ perturbation. To see how, note that by a slight variant of the argument that led to the interconnected dynamics (4), we can show that replacing y by $y + \Delta$ produces the new $x_1$ dynamics $\dot{x}_1 = G(|gx_2^+ + \delta_1|)$, where $\delta_1 = \Delta$. If $x(\cdot)$ is valued in $S_{a,b,c}^\mu$ and the continuous perturbation $\delta$ is valued in (22) for some choice of the constant $r_0 \in (0,1)$, and if G is $C^1$, then we can use the Mean Value Theorem to rewrite our new $x_1$ subsystem as $$\dot{x}_1 = \tilde{G}(x_2^+)x_2^+ + G(gx_2^+)\delta_1 + (G(|gx_2^+ + \delta_1|) - G(gx_2^+))(gx_2^+ + \delta_1) \quad (23)$$
$$= \tilde{G}(x_2^+)x_2^+ + d_*\delta_1,$$

where $|d_*|$ is bounded by $\overline{\Delta} = |G'|_{[0,g(a+c)+(1-r_0)\mathcal{M}_0]}(g(a+c)+(1-r_0)\mathcal{M}_0\gamma) + |G|_{[0,g(a+c)]}$, and where we used the fact that $x_2 \leq a+c$ if $x \in S_{a,b,c}^\mu$. This produces a perturbed system that is covered by Proposition 3 (with $\delta_1$ in the proposition replaced by the scaled perturbation $d_*\delta_1$). Therefore, for each constant $r_0 \in (0,1)$, each set $S_{a,b,c}^\mu$ is robustly forwardly invariant for the perturbed dynamics $$\dot{x} = \begin{bmatrix} G(|gx_2^+ + \delta_1(t)|)(gx_2^+ + \delta_1(t)) \\ -\gamma(x_1 + x_2 + \delta_2(t)) \end{bmatrix} \quad (24)$$

when we restrict the perturbations $\delta$ to be piecewise continuous locally bounded functions that are valued in $$\mathcal{D}_{a,b,c}^{b,s,\mu} = \left(-\frac{(1-r_0)\gamma\mathcal{M}_0}{\max\{1,\overline{\Delta}\}} - \frac{(1-r_0)\gamma\mathcal{M}_0}{\max\{1,\overline{\Delta}\}}\right) \times (-r_0\mathcal{M}_0, r_0\mathcal{M}_0) \quad (25)$$

which is a scaled version of the product set (22) from Remark 2.

Section 5. Robustness to Delays and Perturbations

We have so far shown how the closed loop pointing system is effected by perturbations when there are no delays. We next prove stability properties on robustly forward invariant sets under delays but without perturbations; see Theorem 3 for robustness under both delays and perturbations, under a slightly more restrictive delay bound. In what follows, the delay only occurs in $x_1$, which corresponds to delays between the output of the pointer acceleration system and the user's perception of the pointer location. See Section 7 for an example showing how the delay bound in the following theorem cannot be removed. Our strategy for handling delay is to add together: (i) a Lyapunov type function for the corresponding non-delayed system; and (ii) a double integral term whose bounds involve the delay. This so-called Lyapunov-Krasovskii method.

Theorem 2

(A) For all positive constants b, c, and a>max{b, c}, nondecreasing locally Lipschitz functions $\overline{G}$: $[0,\infty) \to [0,\infty)$ that are positive on $(0,\infty)$, and constants $$\gamma > \tilde{G}(a+c)(a+c)/c \tag{26}$$

and $$\tau \in \left[0, \frac{1}{(a+c)\tilde{G}(a+c)} \min\left\{b, c - \frac{1}{\gamma}\tilde{G}(a+c)(a+c)\right\}\right), \tag{27}$$

we have the following: for all initial functions valued in $S_{a,b,c}$, all solutions of $$\dot{x}(t) = \begin{bmatrix} \tilde{G}(x_2^+(t))x_2^+(t) \\ -\gamma(x_1(t-\tau) + x_2(t)) \end{bmatrix} \tag{28}$$

asymptotically converge to $\varepsilon$. (B) For each bounded nondecreasing locally Lipschitz function $\overline{G}:[0,\infty)\to[0,\infty)$ that is positive on $(0,\infty)$, each constant $\gamma>0$, and each constant $\tau \in [0, 1/|\overline{G}|_{[0,\infty)})$, we have all solutions of (28) asymptotically converge to $\varepsilon$.

Proof

We first prove part (A). We first show that each trajectory $x(\cdot)$ of (28) for any initial value in $S_{a,b,c}$ remains in $S_{a,b,c}$ for all $t \geq 0$. We argue by contradiction. Let $\tau > 0$ be a constant satisfying (27), and pick constants $\bar{a} > a$, $\bar{b} > b$, and $\bar{c} > c$ such that $$\tilde{a} > \max\{\tilde{b}, \tilde{c}\}, \gamma > \frac{\tilde{G}(\tilde{a}+\tilde{c})(\tilde{a}+\tilde{c})}{\tilde{c}}, \tag{29}$$

and $$\tau < \frac{\min\{b, c_p\}}{\tilde{G}(\tilde{a}+\tilde{c})(\tilde{a}+\tilde{c})},$$

where $c_p = c - |\tilde{G}^\sharp|_{[,a+c]}/\gamma$ as before. We can always find such values $\bar{a}$, $\bar{b}$, and $\bar{c}$ because of the strictness of the inequalities in our assumptions and the continuity of $\overline{G}$. If $x(\ell)$ did not remain in $S_{a,b,c}$, then set $t_1 = \sup\{s \geq 0 : x(\ell) \in S_{a,b,c}$ for all $\ell \in [0,s]\}$, and let $t_2 > t_1$ be such that $x(\ell) \in S_{\bar{a},\bar{b},\bar{c}}$ for all $\ell \in [0,t_2]$. Such a $t_2$ exists because $S_{a,b,c} \subseteq \text{interior}(S_{\bar{a},\bar{b},\bar{c}})$. Then the restriction of $x(\cdot)$ to $[0,t_2]$ is a solution for the perturbed dynamics (16) starting in $S_{a,b,c}$, for $\delta(\ell) = x_1(\ell-\tau) - x_1(\ell)$, which satisfies $$|\delta(\ell)| \leq \int_{t-\tau}^{t} \tilde{G}(x_2^+(r))x_2^+(r)dr \tag{30}$$

$$\leq \tau \tilde{G}(\tilde{a}+\tilde{c})(\tilde{a}+\tilde{c}) < \min\{b, c_p\}.$$

Because $\delta(\ell)$ remains in $\mathcal{D}_{a,b,c}$ on $[0,t_2]$, it follows from Proposition 2 that $x(\cdot)$ stays in $S_{a,b,c}$ on $[0,t_2]$, contradicting the definition of $t_1$.

Because $\tau < 1/G(a+c)$, there is a constants $\varepsilon \in (0,1)$ such that $$\tau < \sqrt{\frac{1-\varepsilon}{\tilde{G}(a+c)\left(\frac{\tilde{G}(a+c)}{1-\varepsilon} + \gamma\varepsilon\right)}}, \tag{31}$$

because the right side of (31) converges to $1/\overline{G}(a+c)$ as $\varepsilon \to 0$ from the right. Fix such a constant $\varepsilon > 0$. We now use the function $$V_n(x) = \int_0^{x_2} \tilde{G}(\zeta^+)\zeta^+ d\zeta + \frac{\gamma}{2}\{x_1^2 + \varepsilon x_2^2 + 2\varepsilon x_1 x_2\}. \tag{32}$$

Note that $V_n$ is not a Lyapunov function with respect to $\varepsilon$ on $\mathbb{R}^2$, because it is not identically zero on $\varepsilon$. For instance, $$V_n((1,-1)) = \frac{\gamma}{2}(1-\varepsilon).$$

Nevertheless, we use $V_n$ and Barbalat's Lemma to prove our stabilization result under our delay bound (27), as follows.

Along all trajectories of (28) starting in $S_{a,b,c}$, we have $$\frac{d}{dt}V_n(x(t)) = -\gamma\left[\tilde{G}^\sharp(x_2^+(t)) + \frac{\gamma}{2}(2\varepsilon x_1(t) + 2\varepsilon x_2(t))\right](x_1(t-\tau) + x_2(t)) + \tag{33}$$

$$\frac{\gamma}{2}(2x_1(t) + 2\varepsilon x_2(t))\tilde{G}^\sharp(x_2^+(t))$$

$$= -\gamma[\tilde{G}^\sharp(x_2^+(t)) + \varepsilon\gamma(x_1(t) + x_2(t))]$$

$$\left(x_1(t) - \int_{t-\tau}^{t}\tilde{G}^\sharp(x_2^+(\ell))d\ell + x_2(t)\right) +$$

$$\gamma(x_1(t) + x_2(t))\tilde{G}^\sharp(x_2^+(t)) + \gamma(\varepsilon-1)\tilde{G}(x_2^+(t))(x_2^+(t))^2$$

$$= -W(x(t)) + \mathcal{A}(x_t),$$

where $\tilde{G}^\sharp(r) = \overline{G}(r)r$ as before, and $$W(x) = \gamma(1-\varepsilon)\overline{G}(x_2^+)(x_2^+)^2 + \gamma^2\varepsilon(x_1+x_2)^2,$$

$$\mathcal{A}(x_t) = \gamma[\overline{G}(x_2^+(t))x_2^+(t) + \varepsilon\gamma(x_1(t) + x_2(t))]\mathcal{I}_t,$$

and $$\mathcal{I}_t = \int_{t-\tau}^{t}\overline{G}(x_2^+(\ell))x_2^+(\ell)d\ell.$$

Because $x_2 \leq a+c$ for all $x \in S_{a,b,c}$ and $\overline{G}$ is nondecreasing, we get $\overline{G}(x_2^+) \leq (\overline{G}(a+c)\overline{G}(x_2^+))^{1/2}$ for all $x \in S_{a,b,c}$. Hence, because $x(\ell) \in S_{a,b,c}$ for all $\ell \geq 0$, the Jensen inequality gives $$\mathcal{I}_t^2 \leq \tau \int_{t-\tau}^{t}\overline{G}(x_2^+(\ell))(x_2^+(\ell))^2 d\ell\,\overline{G}(a+c) \tag{34}$$

so two applications of Young's inequality give $$\mathcal{A}(x_t) \leq \frac{1}{2}\gamma(1-\varepsilon)\tilde{G}(x_2^+(t))(x_2^+(t))^2 + \frac{\gamma\tilde{G}(a+c)}{2(1-\varepsilon)}\mathcal{I}_t^2 + \tag{35}$$

$$\frac{1}{2}\gamma^2\varepsilon(x_1(t) + x_2(t))^2 + \frac{\varepsilon\gamma^2}{2}\mathcal{I}_t^2$$

$$\leq \frac{1}{2}W(x(t)) + \bar{B}\int_{t-\tau}^{t}\tilde{G}(x_2^+(\ell))(x_2^+(\ell))^2 d\ell$$

where $$\bar{B} = \frac{\tau\gamma\tilde{G}(a+c)}{2}\left(\frac{\tilde{G}(a+c)}{1-\varepsilon} + \gamma\varepsilon\right). \tag{36}$$

Using (35) to upper bound $\mathcal{A}(x_t)$ in (33), we get $$\frac{d}{dt}V_n(x(t)) \leq -\frac{1}{2}W(x(t)) + \bar{\mathcal{B}}\int_{t-\tau}^{t}\tilde{G}(x_2^+(\ell))(x_2^+(\ell))^2 d\ell. \quad (37)$$

Also, (31) gives $$\bar{\mathcal{B}} < \frac{\gamma}{2\tau}(1-\varepsilon).$$

Fix any constant $\mathcal{L}>0$ such that $$\bar{\mathcal{B}} < \mathcal{L} < \frac{\gamma}{2\tau}(1-\varepsilon). \quad (38)$$

Notice that for all $t \geq 0$, we have $$\frac{d}{dt}\int_{t-\tau}^{t}\int_{s}^{t}\tilde{G}(x_2^+(\ell))(x_1^+(\ell))^2 d\ell ds =$$

$$\tau\tilde{G}(x_2^+(t))(x_2^+(t))^2 - \int_{t-\tau}^{t}\tilde{G}(x_2^+(\ell))(x_2^+(\ell))^2 d\ell.$$

Hence, (37) and our bounds on $\mathcal{L}$ give a constant $c_0>0$ such that the time derivative of $$V^\sharp(x_t) = V_n(x(t)) + \mathcal{L}\int_{t-\tau}^{t}\int_{s}^{t}\tilde{G}(x_2^+(\ell))(x_2^+(\ell))^2 d\ell ds \quad (39)$$

along all trajectories of (28) starting in $S_{a,b,c}$ satisfies $$\frac{d}{dt}V^\sharp(x_t) \leq -\frac{1}{2}W(x(t)) + \mathcal{L}\tau\tilde{G}(x_2^+(t))(x_2^+(t))^2 + \quad (40)$$

$$(\bar{\mathcal{B}} - \mathcal{L})\int_{t-\tau}^{t}\tilde{G}(x_2^+(\ell))(x_2^+(\ell))^2 d\ell$$

$$\leq -c_0 W(x(t)).$$

The forward invariance of the compact set $S_{a,b,c}$ ensures boundedness of $x(t)$, and so also absolute continuity of $W(x(t))$. Because W is positive definite with respect to $\varepsilon$, and because (40) implies that $\int_{0}^{\infty}W(x(\ell))d\ell<\infty$, Barbalat's Lemma gives $\lim_{t\to\infty}W(x(t))=0$, and therefore also convergence of $x(t)$ to $\varepsilon$. This proves part (A). To prove part (B), we replace $\overline{G}(a+c)$ in the preceding argument by $|\overline{G}|_{[0,\infty)}$, and omit the portion of the argument about bounding $\delta(t)$, because no robust forward invariance is needed when proving a result on $\mathbb{R}^2$ when $\overline{G}$ is bounded. This proves the theorem.

Theorem 2 provides a simple bound on the allowable constant delay $\tau$ that ensures attractivity properties of the input delayed model (28). It can be applied when one knows a suitable upper bound on $\tau$, even if the exact value of $\tau$ is uncertain. However, because Theorem 2 is based on Barbalat's Lemma instead of a strict Lyapunov function, it does not lend itself to proving ISS properties for $$\dot{x}(t) = \begin{bmatrix} \tilde{G}(x_2^+(t))x_2^+(t) \\ -\gamma(x_1(t-\tau) + x_2(t) + \delta(t)) \end{bmatrix} \quad (41)$$

with uncertainty $\delta(t)$ and constant delay $\tau$. Therefore, we prove the next result on (41), under a slightly more restrictive bound on $\tau$ than the one in Theorem 2 (but see Remark 4 for a further generalization with perturbations in both equations). We use a different $\mathcal{H}$ from the one in Proposition 1. Our new choice of $\mathcal{H}$ will not satisfy the requirements (1)-(4) from Theorem 1 for all $r \geq 0$, but it will satisfy the requirements (1)-(4) for all $r \leq a+c$ and so is a valid choice when we restrict x to any of our robustly forwardly invariant sets $S_{a,b,c}$.

Theorem 3

Let $\overline{G}: [0,\infty) \to [0,\infty)$ be $C^1$, positive definite with respect to $\{0\}$, and nondecreasing. Let $b>0$, $c>0$, and $a>\max\{b,c\}$ be constants. Set $$\mathcal{H}(r) = r^+\overline{G}(r^+), \quad (42)$$

and let the constant $\gamma>0$ be such that $c>|\bar{G}^\sharp|_{[0,a+c]}/\gamma$ and $$\gamma > \sup_{r \in (0,a+c]}\max\{4\mathcal{H}'(r), 2\mathcal{H}^2(r)/\int_{0}^{r}\overline{G}(\ell)\ell d\ell\}. \quad (43)$$

Set $c_p = c - \overline{G}(a+c)(a+c)/\gamma$. Then for all constants $\tau$ such that $$0 \leq \tau < \min\left\{\frac{1}{2\gamma}, \frac{\min\{b, c_p\}}{(a+c)\tilde{G}(a+c)}\right\} \quad (44)$$

the system (41) is ISS with respect to $\varepsilon$ and $u = (-\bar{\delta}, \bar{\delta})$ on $\mathcal{S} = S_{a,b,c}$, where $\bar{\delta} = \min(b, c_p) - \tau\overline{G}(a+c)(a+c)$.

Proof

Because (44) implies that the bound $\tau < \min\{b, c_p\}/((a+c)\overline{G}(a+c))$ from Theorem 2 holds, we can use our bound on $|\delta|$ to argue as in the first part of the proof of Theorem 2 (with $\delta$ from the earlier proof replaced by the combined disturbance $\delta^\sharp(\ell) = x_1(\ell-\tau) - x_1(\ell) + \delta(\ell)$) to prove that $S_{a,b,c}$ is robustly forwardly invariant for (41) with perturbations valued in $u = (-\bar{\delta}, \bar{\delta})$, when (44) holds.

In particular, $S_{a,b,c}$ is strongly invariant for (41) when $\tau=0$ and $\delta=0$. Therefore, because $x_2^+ \leq a+c$ for all $x \in S_{a,b,c}$, and because (43) implies that (42) satisfies Conditions (1)-(4) from Theorem 1 when we restrict to values $r \leq a+c$, the decay estimate (8) from Theorem 1 holds along all trajectories of (41) starting in $S_{a,b,c}$ when $\tau=0$ and $\delta=0$. Hence, along all trajectories of (41) starting in $S_{a,b,c}$ for all $\tau \geq 0$ satisfying (44) and $\delta=0$, our choice (42) of $\mathcal{H}$ gives $$\frac{d}{dt}V_{new}(x) \leq -\frac{\gamma^2}{4}(x_1+x_2)^2 - \frac{1}{2}\mathcal{H}(x_2)\tilde{G}(x_2^+)x_2^+ + \quad (45)$$

$$\gamma[-\mathcal{H}'(x_2)(x_1+x_2) + \gamma(x_1+x_2)]$$

$$\int_{t-\tau}^{t}\tilde{G}(x_2^+(\ell))x_2^+(\ell)d\ell$$

$$\leq -\frac{\gamma^2}{4}(x_1+x_2)^2 - \frac{1}{2}\mathcal{H}(x_2(t))\tilde{G}(x_2^+)x_2^+ +$$

$$\left\{\frac{5\gamma^2}{4}|x_1+x_2|\int_{t-\tau}^{t}\tilde{G}(x_2^+(\ell))x_2^+(\ell)d\ell\right\}$$

where we used (8), (42), and (43). Using Jensen's inequality, we get $$\frac{5\gamma^2}{4}|x_1(t)+x_2(t)|\int_{t-\tau}^{t}\tilde{G}(x_2^+(\ell))x_2^+(\ell)d\ell \leq \quad (46)$$

$$\frac{1}{5}\gamma^2(x_1(t)+x_2(t))^2 + 2\tau\gamma^2\int_{t-\tau}^{t}\mathcal{H}^2(x_2^+(\ell))d\ell,$$

by our choice (42) of $\mathcal{H}$, because the triangle inequality gives $$5/4pq \leq 5/4((1/2)(8/5)p^2 + (1/2)(25/8)q^2)$$

for all $p \geq 0$ and $q \geq 0$.

By our delay bound (44), we can find a constant J>0 such that $$\tau < \frac{\sqrt{1-2J\tau}}{2\gamma}, \quad (47)$$

so $1-4\tau^2\gamma^2-2J\tau>0$. Also, our choice (42) of $\mathcal{H}$ implies that as $\alpha_0 \in \mathcal{K}_\infty$ from the proof of Theorem 1 satisfies $$\alpha_0(V_{new}(x)) \le \frac{\gamma^2}{4}(x_1+x_2)^2 + \frac{1}{2}\mathcal{H}^2(x_2) \quad (48)$$

for all $x \in S_{a,b,c}$. Hence, we can use (46) to upper bound the quantity in curly braces in (45) and the relation $$\frac{d}{dt}\int_{t-\tau}^t\int_s^t \mathcal{H}^2(x_2^+(\ell))d\ell = \tau\mathcal{H}^2(x_2^+(t)) - \int_{t-\tau}^t \mathcal{H}^2(x_2^+(\ell))d\ell \quad (49)$$

to conclude that along all trajectories of (41) for $\delta=0$ starting in $S_{a,b,c}$ for any constant $\tau>0$ satisfying (44), the function $$V_{new}^\sharp(x_t) = V_{new}(x(t)) \circ (2\tau\gamma^2 + J)\int_{t-\tau}^t\int_s^t \mathcal{H}^2(x_2^+(\ell))d\ell\, ds$$

satisfies $$\frac{d}{dt}V_{new}^\sharp(x_t) \le -\frac{\gamma^2}{20}(x_1(t)+x_2(t))^2 - J\int_{t-\tau}^t \mathcal{H}^2(x_2^+(\ell))d\ell - \quad (50)$$

$$\left(\frac{1}{2} - 2\tau^2\gamma^2 - J\tau\right)\mathcal{H}^2(x_2^+(t))$$

$$\le -\min\left\{\frac{1}{5}, 1-4\tau^2\gamma^2-2J\tau\right\}\alpha_0(V_{new}(x(t))) -$$

$$\frac{J}{\tau}\int_{t-\tau}^t\int_s^t \mathcal{H}^2(x_2^+(\ell))d\ell\, ds$$

$$\le -\mathcal{M}_0\{\alpha_0(V_{new}(x(t))) +$$

$$(2\tau\gamma^2 + J)\int_{t-\tau}^t\int_s^t \mathcal{H}^2(x_2^+(\ell))d\ell\, ds\}$$

$$\le -\alpha_0^b(V_{new}^\sharp(x_t)),$$

where $$\mathcal{M}_0 = \min\left\{\frac{1}{5}, 1-4\tau^2\gamma^2-2J\tau, \frac{J}{\tau(2\tau\gamma^2+J)}\right\}$$

and $$\alpha_0^b(r) = \mathcal{M}_0\min\left\{\alpha_0\left(\frac{r}{2}\right), \frac{r}{2}\right\}$$

is of the class $\mathcal{K}_\infty$, and where we used the fact that for the class $\mathcal{K}_\infty$ function $\alpha(\ell)=\min(\alpha_0(\ell),\ell)$, we have $\alpha((a+b)/2) \le \alpha(a)+\alpha(b)$ for all $a\ge 0$ and $b\ge 0$. Using the fact that $|\nabla V_{new}|$ is bounded by some constant $V^*_{a,b,c}$ on the compact set $S_{a,b,c}$, it follows that along all trajectories of (41) starting in $S_{a,b,c}$, and for all constant delays $\tau$ satisfying (44) and all perturbations $\delta \in \mathcal{M}(u)$, we have $$\frac{d}{dt}V_{new}^\sharp(x_t) \le -\alpha_0^b(V_{new}^\sharp(x_t)) + \gamma V^*_{a,b,c}|\delta|_{[0,t]}. \quad (51)$$

Therefore, $V_{new}^\sharp$ is an ISS Lyapunov function for (41) with respect to $\varepsilon$ and $u$ on $S = S_{a,b,c}$, which implies the ISS property.

Remark
We can generalize Theorem 3 to provide ISS results for $$\dot{x}(t) = \begin{bmatrix} \tilde{G}(x_2^+(t))x_2^+(t) + \delta_1(t) \\ -\gamma(x_1(t-\tau) + x_2(t) + \delta_2(t)) \end{bmatrix} \quad (52)$$

having locally bounded piecewise continuous perturbations $\delta_i$ in both equations and constant input delays $\tau \ge 0$, as follows. We assume that $\overline{G}$, a, b, c, $\gamma$, and $\tau$ satisfy the requirements from Theorem 3, and we let $\mu>1$ be any positive constant. Fix any constant $\overline{d}_1>0$ such that $\tau<\min(b, c_p)/(\tilde{G}^\sharp(a+c)+\overline{d}_1)$, which always exists, by (44). Then (52) is ISS with respect to $\varepsilon$ and $u$ on $S_{a,b,c}^\mu$, where $$\mathcal{U}^\sharp = \left\{\begin{array}{l} d \in \mathbb{R}^2 : |d_1| \le \overline{d}_1, \max\left\{\frac{d_1}{\gamma} - c_p^\sharp, \frac{\mu}{\gamma}(\overline{\sigma}_\mu - d_1)\right\} + \\ \tau(\tilde{G}^\sharp(a+c) + \overline{d}_1) < d_2 < \frac{d_1}{\gamma} + b - \tau(\tilde{G}^\sharp(a+c) + \overline{d}_1) \end{array}\right\}.$$

and $S_{a,b,c}^\mu$, $c_p^\sharp$, and $\overline{\sigma}_\mu$ are as defined in Section 4. This follows from Proposition 3, the use of the augmented perturbation $\delta_2^\sharp(\ell)=x_1(\ell-\tau)-x_1(\ell)+\delta_2(\ell)$, and the fact that the gradient $\nabla V_{new}(x)$ is bounded on the unbounded set $S_{a,b,c}^\mu$, where the terms $\tau(\tilde{G}^\sharp(a+c)+\overline{d}_1)$ were used to bound the terms $x_1(\ell-\tau)-x_1(\ell)$ from $\delta_2^\sharp$. This lets us cover the dynamics (24) with perturbed pointer position measurements. Because of page limitations, we leave the details to the reader.

With this final result, we have shown how the closed loop pointing system is affected by delays and perturbations. These results provide a relationship between the maximum delay, maximal perturbation set, and size of invariant sets, and this relationship depends on the scaling function G and other system parameters. In the future, this relationship can be used to compare the properties of different scaling functions and better design pointing interfaces using acceleration.

Section 6. Simulations

Figure 7A:
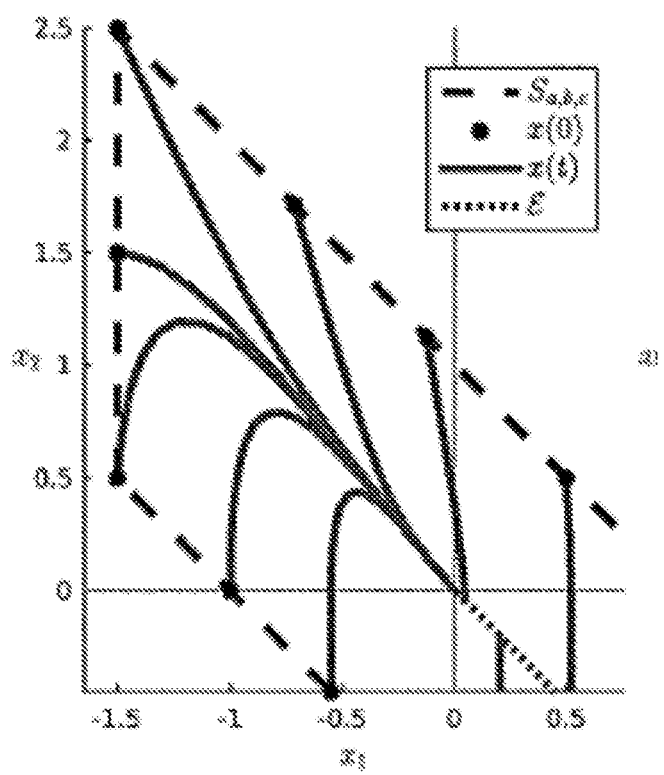
FIG. 7a is a simulation plot of trajectories without delays or perturbations in accordance with one example of the present disclosure.
Figure 7B:
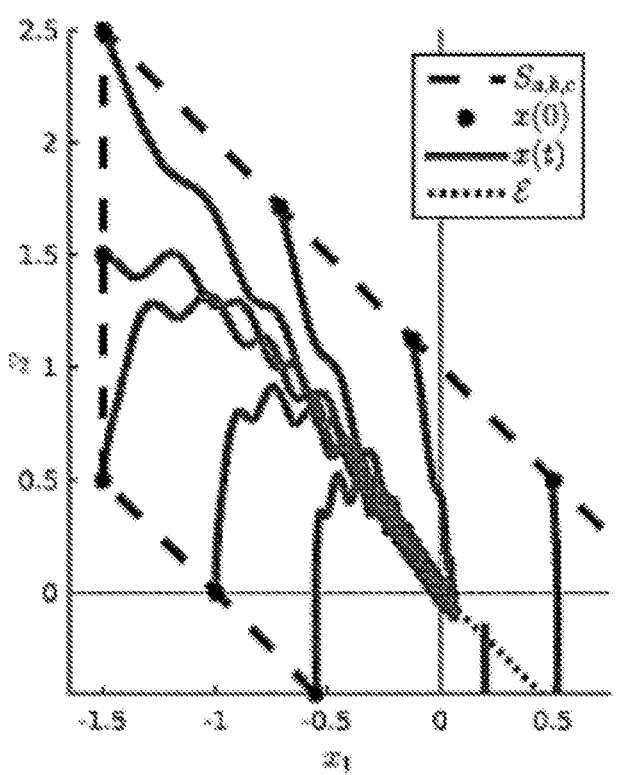
FIG. 7b is a simulation plot of trajectories with delays or perturbations in accordance with one example of the present disclosure.

We use computational simulations to illustrate the results of this paper, including the invariance and stability properties of the closed loop pointing system with perturbations. FIG. 7a-b shows several trajectories of (41) with and without delays and perturbations, with initial conditions selected in $S_{a,b,c}$. For this simulation, we chose the linear scaling function $\overline{G}(s)=1+0.1$ s, g=1, and the parameter values a=1.5, b=c=1, and $\gamma=7$, which satisfy our requirements $$1 = c > \frac{|\tilde{G}^\sharp|_{[0,a+c]}}{\gamma} \approx 0.4 \text{ and}$$

$$7 = \gamma > \sup_{r \in (0,a+c)} \max\left\{4\mathcal{H}'(r), 2\mathcal{H}^2(r) \Big/ \int_0^r \tilde{G}(\ell)d\ell\right\} = 6$$

from Theorem 3. Using the notation from Theorem 3, we get $c_p = c - \overline{G}(a+c)(a+c)/\gamma\gamma \approx 0.6$, so our delay condition (44) becomes $$0 \le \tau < \min\left\{\frac{1}{2\gamma}, \frac{\min\{b, c_p\}}{(a+c)\tilde{G}(a+c)}\right\} \approx 0.1 \quad (53)$$

and the delay bound from Theorem 3 is $\bar{\delta}=\min\{b,c_p\}-\tau\bar{G}(a+c)(a+c)\approx0.3$. For our simulation, we chose $\tau=0.1$ and $\delta(t)=0.3 \sin(10\pi t)$. Without perturbations, the trajectories with initial states in $S_{a,b,c}$ converge asymptotically to the equilibrium set $\varepsilon$. When we add perturbations, the trajectories do not always converge to $\varepsilon$, but do remain within $S_{a,b,c}$. These figures show that, at least for these choices of parameters, $S_{a,b,c}$ is invariant and $\varepsilon$ is attractive.

It is tempting to surmise that our delay conditions such as (27) can be eliminated, so that our robust forwardly invariant conclusions would remain true without the delay bounds. However, we cannot drop our delay conditions, even if there are no perturbations. For instance, if we take $\bar{G}(s)=1+0.1s$, $g=1$, and the values $a=1.5$, and $b=c=1$ as in our simulation, then the corresponding set $S_{a,b,c}$ has the upper left vertex (−1.5,2.5). However, the solution of (28) for the initial state $(-1.5, 2.5) \in S_{a,b,c}$ and the delay $\tau=0.5$ passes through $(0,1.52) \notin S_{a,b,c}$, so $S_{a,b,c}$ would no longer be forwardly invariant for (28), if we were to allow a larger delay such as $\tau=0.5$. Hence, our delay bound (27) from Theorem 2 cannot be removed.

Certain embodiments of the present disclosure can be implemented in hardware, software, firmware, or a combination thereof. For example, a module in software is a part of a software program, whereas a module in hardware is a self-contained component. Various embodiments of the present disclosure are implemented in software or firmware that is stored in a memory and that is executed by a suitable instruction execution system. If implemented in hardware, various embodiments can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In one embodiment, the flowchart of FIG. 1 and other disclosed processes comprise an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

We claim:

1. A method comprising:
obtaining, by a computing device, a closed loop pointer acceleration system model, in which the closed loop pointer acceleration system model is based on (1) a model describing user pointing motions integrated with (2) a model of pointer acceleration motions under operational conditions;
obtaining, by the computing device, values for system parameters that include pointer acceleration profile parameters and operational condition parameters;
determining, by the computing device, a set of pointer trajectories for a given acceleration profile having the pointer acceleration profile parameters and operational condition parameters;
repeating the obtaining and determining operations for a new set of system and operational condition parameters; and
outputting a side-by-side comparison of determined sets of pointer trajectories for different pointer acceleration profiles on a display.

2. The method of claim 1, further comprising plotting a trajectory of the pointer acceleration profile based on the determined set of pointer trajectories.

3. The method of claim 1, further comprising plotting one or more trajectories of different pointer acceleration profiles based on the determined sets of pointer trajectories.

4. The method of claim 1, wherein the operational conditions are represented as at least a delay function and a perturbation function.

5. The method of claim 4, wherein the delay function is a constant.

6. The method of claim 1, wherein the pointer acceleration profile parameters include a gain parameter.

7. An apparatus comprising:
a processor and memory,
the processor configured to obtain a closed loop pointer acceleration system model, in which the closed loop pointer acceleration system model is based on (1) a model describing user pointing motions integrated with (2) a model of pointer acceleration motions under operational conditions; obtain values for system parameters that include pointer acceleration profile parameters and operational condition parameters; and determine & output a set of pointer trajectories for a given acceleration profile having the pointer acceleration profile parameters and operational condition parameters,
wherein the processor is further configured to repeat the obtaining and determining operations for a new set of system and operational condition parameters,
wherein the processor is further configured to output a side-by-side comparison of determined sets of pointer trajectories for different pointer acceleration profiles on a display.

8. The apparatus of claim 7, wherein the processor is further configured to plot a trajectory of the pointer acceleration profile based on the determined set of pointer trajectories.

9. The apparatus of claim 7, wherein the processor is further configured to plot one or more trajectories of different pointer acceleration profiles based on the determined sets of pointer trajectories.

10. The apparatus of claim 7, wherein the operational conditions are represented as at least a delay function and a perturbation function.

11. The apparatus of claim 7, wherein the pointer acceleration profile parameters include a gain parameter.

12. A non-transitory computer readable medium storing a plurality of computer instructions that, when executed by at least one computing device, cause the at least one computing device to at least:

- obtain a closed loop pointer acceleration system model, in which the closed loop pointer acceleration system model is based on (1) a model describing user pointing motions integrated with (2) a model of pointer acceleration motions under operational conditions;
- obtain values for system parameters that include pointer acceleration profile parameters and operational condition parameters; and
- determine and output a set of pointer trajectories for a given acceleration profile having the pointer acceleration profile parameters and operational condition parameters;
- repeat the obtaining and determining operations for a new set of system and operational condition parameters, and
- output a side-by-side comparison of determined sets of pointer trajectories for different pointer acceleration profiles on a display.

13. The non-transitory computer readable medium of claim 12, wherein the plurality of instructions further cause the at least one computing device to plot a trajectory of the pointer acceleration profile based on the determined set of pointer trajectories.

14. The non-transitory computer readable medium of claim 12, wherein the operational conditions are represented as at least a delay function and a perturbation function.

15. The non-transitory computer readable medium of claim 14, wherein the plurality of instructions further cause the at least one computing device to plot one or more trajectories of different pointer acceleration profiles based on the determined sets of pointer trajectories.

* * * * *